United States Patent [19]

Girona

[11] 4,077,351
[45] Mar. 7, 1978

[54] AMPHIBIOUS RECREATIONAL VEHICLE

[76] Inventor: Manuel Garcia Girona, 7 Montee de l'Eglise, Caluire (Rhone), France

[21] Appl. No.: 650,333

[22] Filed: Jan. 19, 1976

[30] Foreign Application Priority Data

Mar. 14, 1975 France .................... 75.08652

[51] Int. Cl.² ............................................. B63H 16/00
[52] U.S. Cl. ........................................... 115/27; 115/2; 280/287
[58] Field of Search ........................ 115/2, 23, 25, 27; 280/287, 281, 282, 284, 285, 288

[56] References Cited

U.S. PATENT DOCUMENTS

| 1,083,115 | 12/1913 | Mallory | 115/27 |
| 2,359,764 | 10/1944 | Johnson | 280/287 |

FOREIGN PATENT DOCUMENTS

| 1,122,181 | 5/1959 | France | 115/25 |
| 288,629 | 1/1953 | Switzerland | 115/23 |
| 17,294 of | 1889 | United Kingdom | 115/2 |

Primary Examiner—Trygve M. Blix
Assistant Examiner—Jesus D. Sotelo
Attorney, Agent, or Firm—Remy J. VanOphem

[57] ABSTRACT

The amphibious vehicle has a main frame on the forward end of which is mounted a buoyant front wheel for angular steering movement. A transversely mounted rear axle assembly is rotatably supported on the rearward end of the frame. A pair of buoyant wheels and a pair of paddle wheels are mounted on the opposite ends of the rear axle assembly for rotation thereby. A pedal drive on the frame is drivingly connected with the rear axle assembly. A rudder member is mounted on a rearward extension of the frame for angular movement relative thereto. Flexible members transmit the steering movement from the front wheel to the rudder member. The rear axle assembly can be easily disassembled and the frame can be folded for ease of transportation.

4 Claims, 17 Drawing Figures

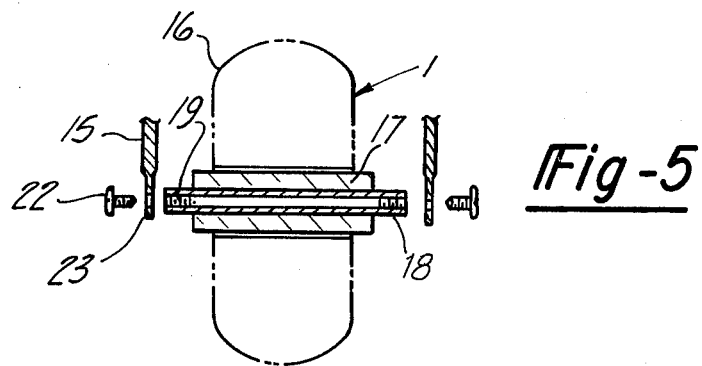
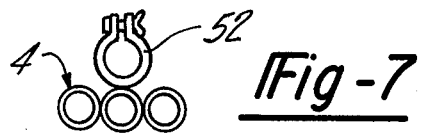
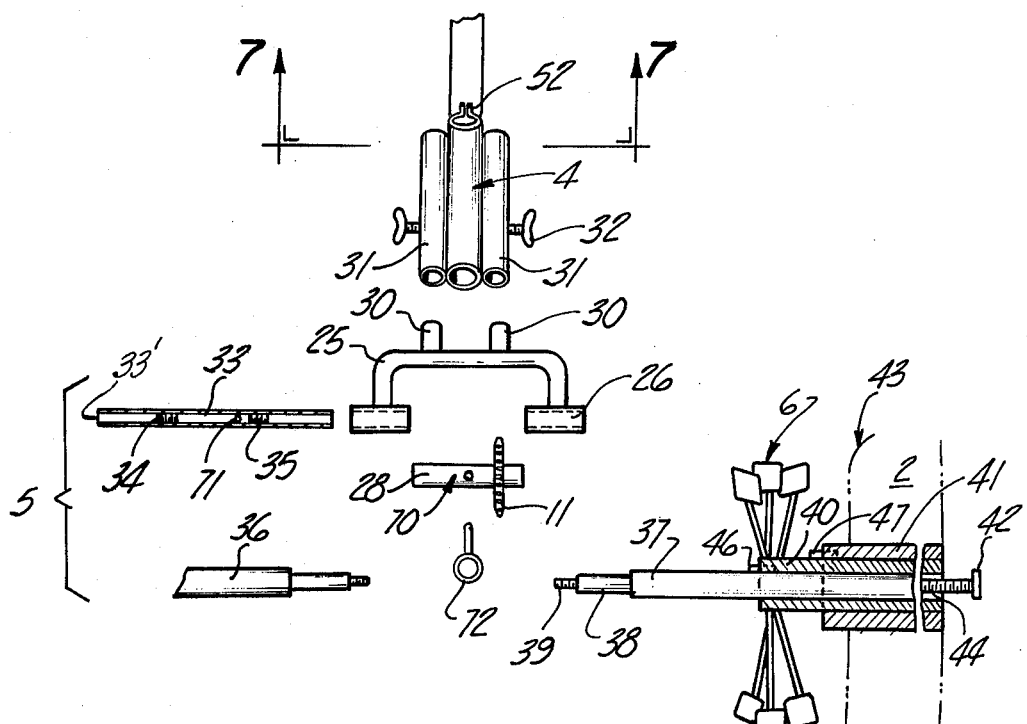

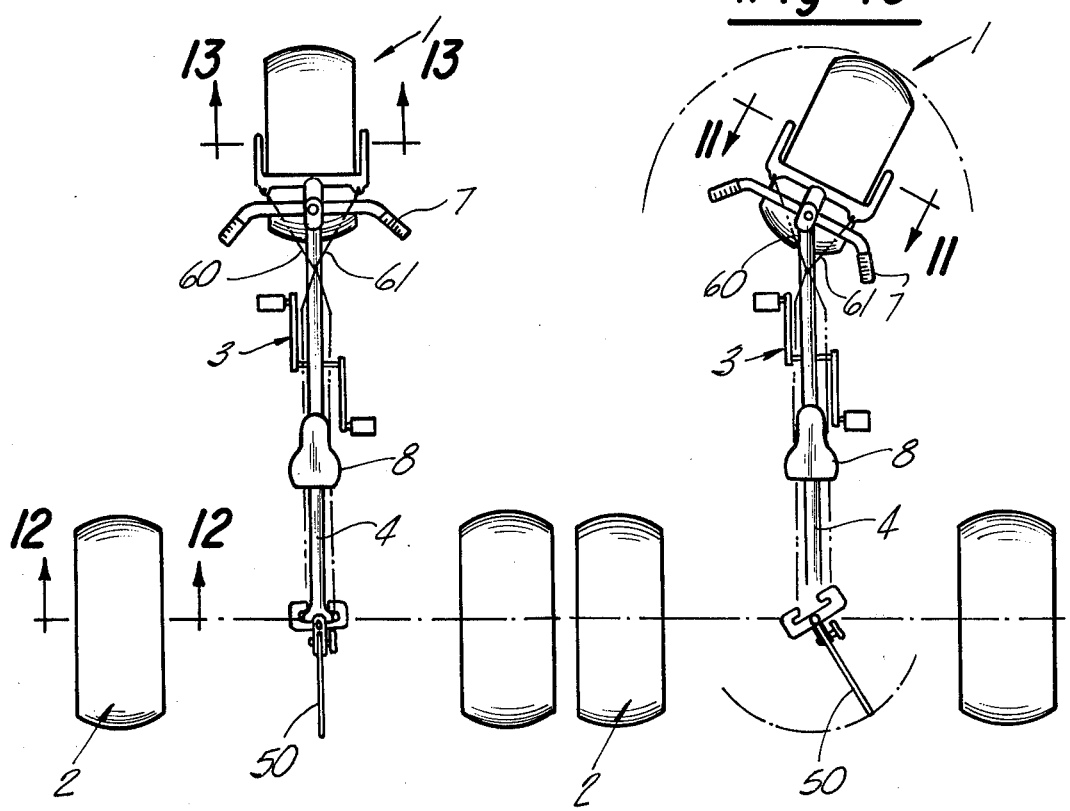
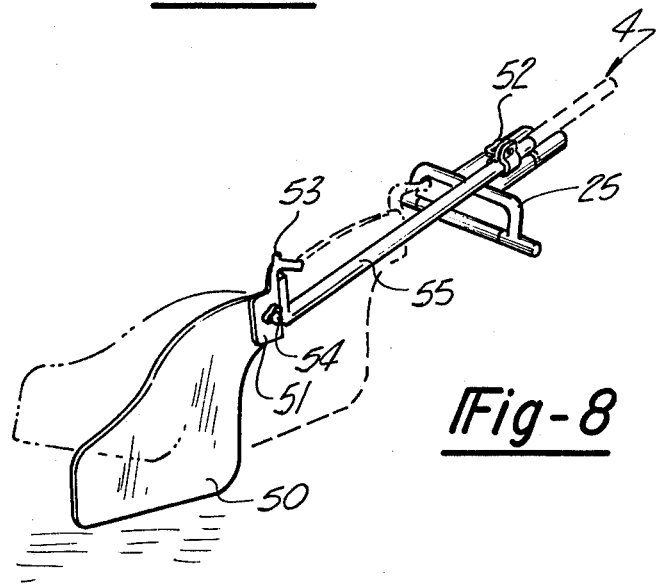

AMPHIBIOUS RECREATIONAL VEHICLE

BACKGROUND OF THE INVENTION

Various recreational amphibious vehicles are known but none are believed to have the advantages of portability and ease of assembly and disassembly as the herein disclosed amphibious vehicle. The invention has for its main object to provide an amphibious vehicle constructed on a tricycle frame using as many conventional parts as possible and requiring a relatively simple steering movement.

SUMMARY OF THE INVENTION

The amphibious vehicle comprises a tricycle frame. A buoyant front wheel is mounted on the forward end of the frame for angular steering movement. A transversely mounted rear axle assembly is rotatably supported on the rearward end of the frame. A pair of buoyant rear wheels and a pair of paddle wheels are secured to opposite ends of the rear axle assembly for rotation therewith. A pedal drive is mounted on the frame and is drivingly connected to the rear axle assembly. A rudder member is mounted on a rearward portion of the frame for angular movement relative thereto. Flexible cables transmit the steering movement from the front wheel to the rudder member.

The frame preferably includes a front-to-rear main frame member and a hinge disposed intermediate the ends of the main frame member to permit folding together of the forward and rearward portions of the vehicle. A U-shaped yoke member is separably connected to the rear end of the frame. The arms of the yoke member carry coaxially aligned, horizontally-disposed bearing sleeves for rotatably supporting the rear axle assembly. A drive sprocket means is mounted on the rear axle assembly at a point intermediate the bearing sleeves.

The paddle wheel has paddles on its circumference which are oriented inwardly so as to direct the discharged water away from the driver.

A preferred means for transmitting steering movement from the front wheel to the rudder member comprises: a steering yoke pivotally connecting the rudder to the frame, and a pair of flexible steering cables extending in cross relation between the fork of the front wheel and the steering yoke.

BRIEF DESCRIPTION OF THE DRAWINGS

FIG. 5 is an exploded view of the front wheel assembly;

FIG. 6 is an exploded view of the rear axle assembly;

FIG. 7 is a sectional view on line 7—7 in FIG. 6;

FIG. 8 is a perspective view of the rudder assembly;

FIGS. 9 and 10 illustrate the steering movement of the rudder;

DETAILED DESCRIPTION OF PREFERRED EMBODIMENTS

Figure 1:
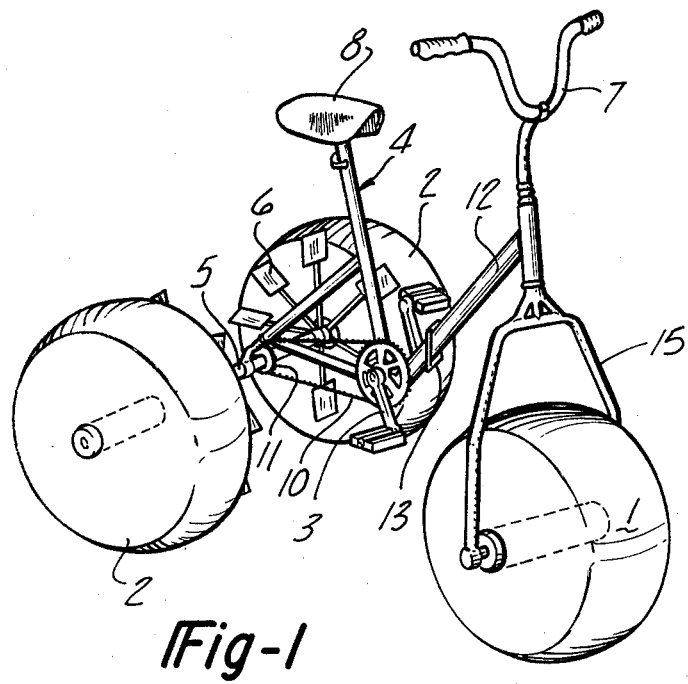
FIGS. 1 and 2 are views of an assembled amphibious vehicle in accordance with this invention.
Figure 3:
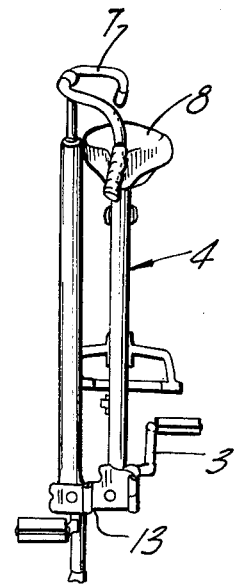
FIGS. 3 and 4 illustrate the foldability of the vehicle's frame.
Figure 2:
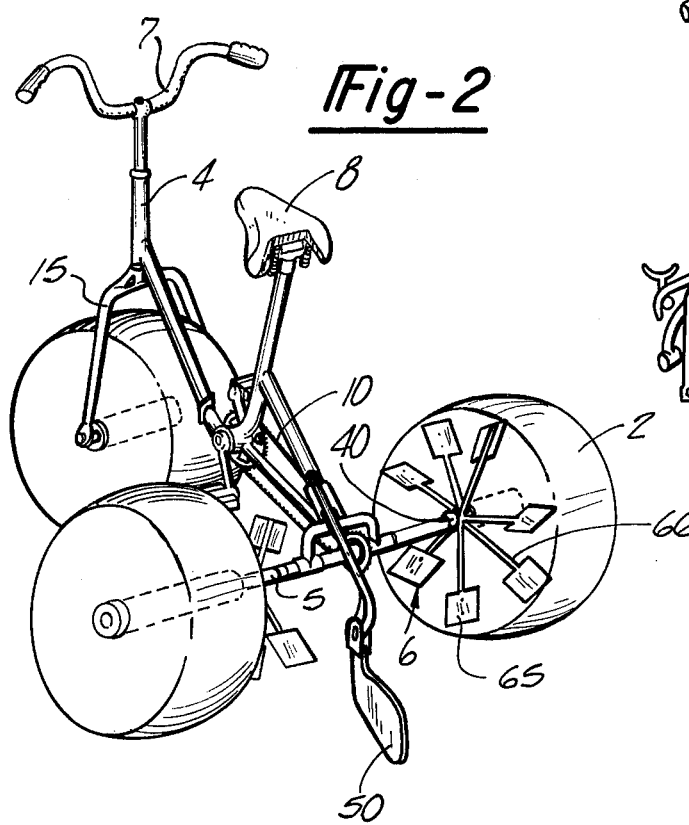
Figure 4:
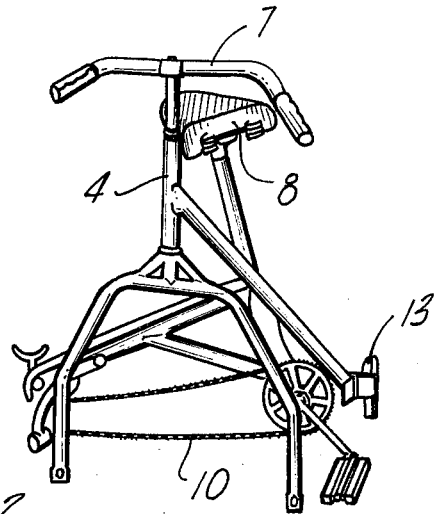

Referring now to the drawings and particularly to FIGS. 1-4, the amphibious tricycle type vehicle comprises a frame, generally designated as 4, having an elongate front-to-rear main frame member 12, a pedal drive 3, a handlebar 7, a saddle 8 and a front fork 15. A hinge member 13 is disposed intermediately at the ends of the main frame member 12 to permit folding together of the forward and rearward portions of the vehicle. The hinge member 13 preferably allows the frame to fold about a vertical pivot axis as illustrated in FIGS. 3 and 4.

A buoyant front wheel 1 is rotatably mounted on fork 15 for angular steering movement. A front axle 18 (FIG. 5) extends through a cylinder 17 carrying a front tire 16. Axle 18 has at its opposite ends threaded sockets 19 for accepting therein hand-operated bolts 22, each passing through a bore 23 in each arm of fork 15.

Frame 4 has a rearward end comprising a U-shaped yoke member 25 (FIG. 6) on which is mounted a rear axle assembly, generally designated as 5. The arms of the yoke member 25 carry coaxially-aligned, horizontally-disposed bearing sleeves 26 for rotatably supporting the rear axle assembly 5. Two spaced-apart posts 30 are symmetrically disposed relative to a vertical plane of symmetry for the yoke member 25. The posts 30 extend outwardly of the yoke member 25 and are adapted to become slidably received by a pair of guide tubes 31 on either side of the plane of symmetry. Posts 30 can be secured to guide tubes 31 by hand-operated bolts 32. The extent to which posts 30 are inserted into guide tubes 31 determines the tension on the tricycle's chain 10.

The rear axle assembly 5 includes the following elements:

a first cylinder 28 whose length is nearly equal to the distance between the inner ends of the bearing sleeves 26 and whose inner diameter is substantially equal to the inner diameter of sleeve 26, and a sprocket wheel 11 mounted on cylinder 28 to the right off-center, as viewed in FIG. 6;

a center axle 33, the length of which is substantially equal to the distance between the outer ends of sleeves 26, and whose outer diameter is nearly equal to the inner diameter of sleeves 26. Axle 33 is hollow at its opposite ends and is provided with threaded inner sockets 34, 35 having left and right hand threads respectively, both being on the opposite sides of the plane of symmetry when the tricycle is assembled. Cylinder 28 has a hole 70 and center axle 33 has a corresponding transverse hole transverse 71 through which extends a pin 72 (FIG. 6);

two stub axles 36, 37, having reduced-diameter portions 38 terminating in ends 39 which are threaded in opposite directions. The outer diameters of portions 38 are slightly less than the inner diameters of an end bores 33' in center axle 33. The lengths of the bores 33' are such as to allow ends 39 to become threadedly received by sockets 34 and 35;

a pair of hollow stub shafts 40, each carrying spokes 66 and paddles 65 forming a paddle wheel, generally designated as 6 (FIG. 2), paddles 65 being oriented inwardly to direct the discharged water away from the driver of the vehicle;

a pair of tubular hubs 41 on which are mounted tires 43 of the rear wheels 2;

a pair of hand-operated bolts 42 adapted to be threadedly received by threaded sockets 44 at the opposite ends of axles 36 and 37; and a stop lug 46 on axles 36, 37, each lug 46 fitting in a longitudinal slot provided in the end wall of stub-shaft 40. In a similar manner each hub 41 carries a stop lug 47 fitting in a longitudinal slot provided in the end wall of hub 41.

The amphibious tricycle of this invention transmits steering movement from the front wheel 1 to a rudder 50 (FIGS. 2, 8–10). A steering yoke 53 pivotally connects the rudder 50 to a rear frame extension 55 detachably coupled to the rear end of main frame 4 by a clamp 52. The rudder 50 is removably fastened by a hand operated screw 54, between two plates 51, forming part of the lower portion of yoke 53. A pair of flexible steering cables 60, 61 extend in cross-relation between fork 15 and steering yoke 53, rudder 50 rotating in a direction opposite to that of the front wheel 1, as illustrated in FIG. 10.

Figure 11:
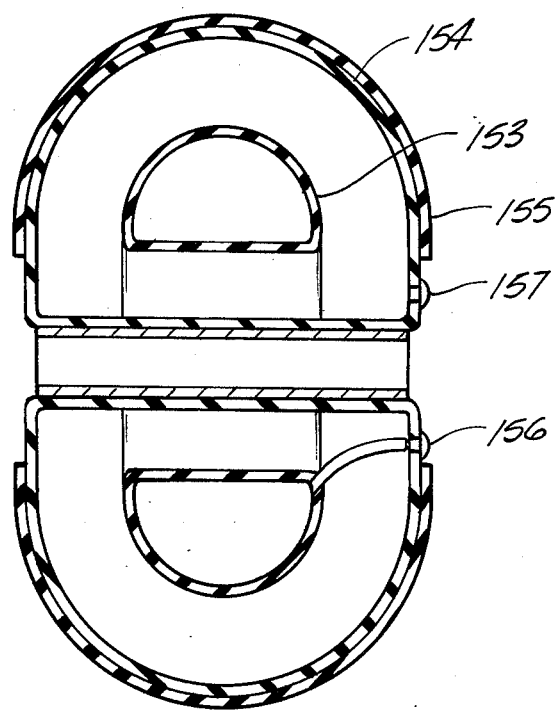
FIG. 11 is a sectional view on line 11—11 in FIG. 10 showing the construction of the front wheel.

Each wheel preferably comprises an inner tube 153, an outer concentric tube 154, and a tire 155. The two concentric tubes 153, 154 (FIG. 11) are independent of each other and have separate valves 156, 157, respectively.

The vehicle can be rapidly assembled by unfolding frame 4 and securing the front wheel 1 to fork 15 with bolts 22 (FIG. 5).

Chain 10 is mounted on sprocket wheel 11 and center axle 33 is inserted through sleeve bearings 26 and cylinder 28. By inserting pin 72 through holes 70, 71, then parts 28, 33 will lock. Posts 30 are then inserted into guide tubes 31 and locked in position by screws 32 after making sure that chain 10 is under sufficient tension. The rear stub axles 36, 37 are then screwed into the center axle 33. Stub-shafts 40 are mounted on stub axles 36, 37 until their slits receive lugs 46. Hubs 41 are mounted on stub shafts 40 until their slits receive lugs 47. By tightening bolts 42, the rear axle assembly 5 becomes securely supported by frame 4. Rudder 50 is then placed between plates 51 and secured thereto by screw 54 and frame extension 55 is secured by clamp 52.

Figure 12:
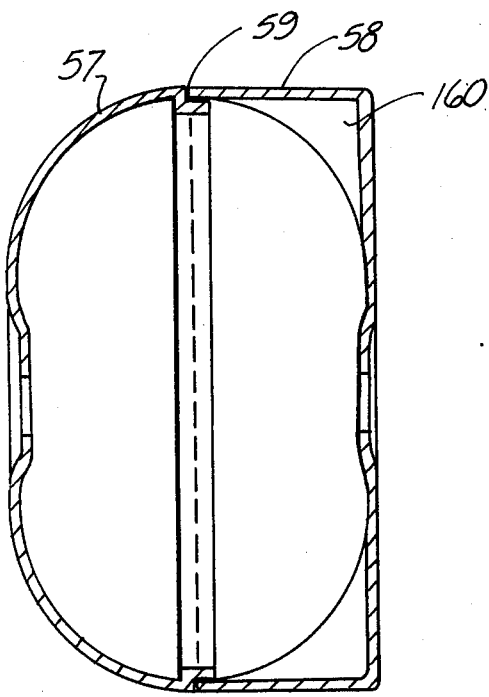
FIG. 12 is a sectional view on line 12—12 in FIG. 9 showing a rigid rear wheel in accordance with a variation of this invention.
Figure 13:
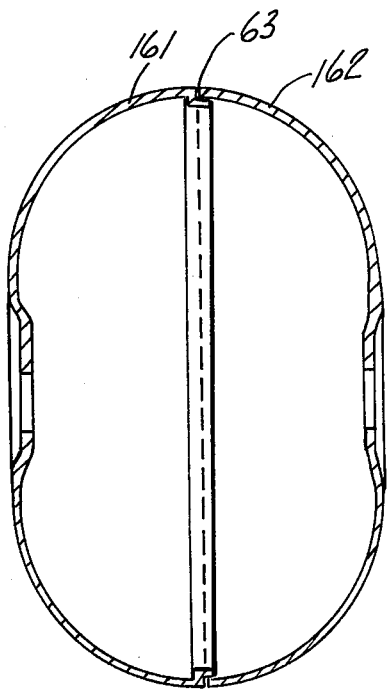
FIG. 13 is a sectional view on line 13—13 in FIG. 9 showing a rigid front wheel.

In accordance with a variation of the invention, each rear wheel 2 can be made of two parts 57, 58 (FIG. 12) having a welded or glued joint 59. The outer part 57 is rounded out while the inner part 58 is rectangular in cross-section and is provided with paddles 160. The front wheel 1 can also be fabricated from two rounded parts 161, 162 (FIG. 13) having a welded or soldered joint 63.

Figure 14:
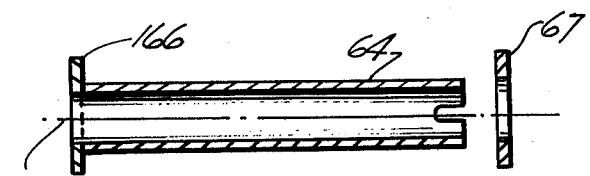
FIG. 14 is a sectional view of the rear hub for use with the wheel shown in FIG. 12.
Figure 15:
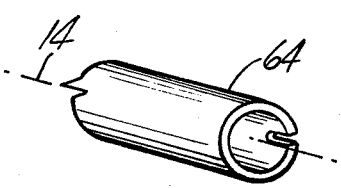
FIG. 15 is a view in perspective of the rear hub shown in FIG. 14.
Figure 16:
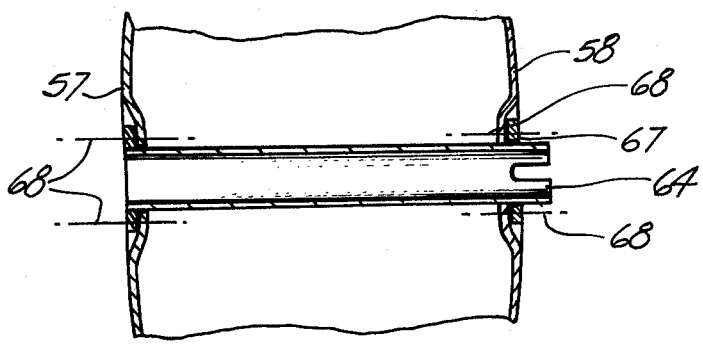
FIG. 16 is a partial sectional view of the hub shown in FIG. 14 and of the rear wheel mounted thereon.

The front wheel 1 has a transverse center bore adapted to receive tubular hub 17 (FIG. 5). The rear wheel 2 (FIGS. 12, 14–16) has transverse center bore adapted to receive a tubular hub 64 (FIG. 14) having a longitudinal axis 14 radially extending disc 166 at one end thereof and a slit at its other end. A locking ring 67 on the slitted end of hub 64 seals the wheel by means of screws 68 (FIG. 16) in an impervious manner. The slits in hubs 64 are adapted to receive lugs 46 on the stub axles 36, 37 (FIG. 6).

A main advantage lies in the fact that the amphibious tricycle of the present invention can also be eaily disassembled, by reversing the above described steps for ease of transportation to and from beaches. In the embodiment wherein the tires carry a pair of concentric air tubes made of pliable plastic (FIG. 11), a puncture of one tube will not be sufficient to cause the vehicle to sink. In the case of the rigid plastic tires (FIGS. 12, 13) the rigidity thereof makes them puncture proof.

Figure 17:
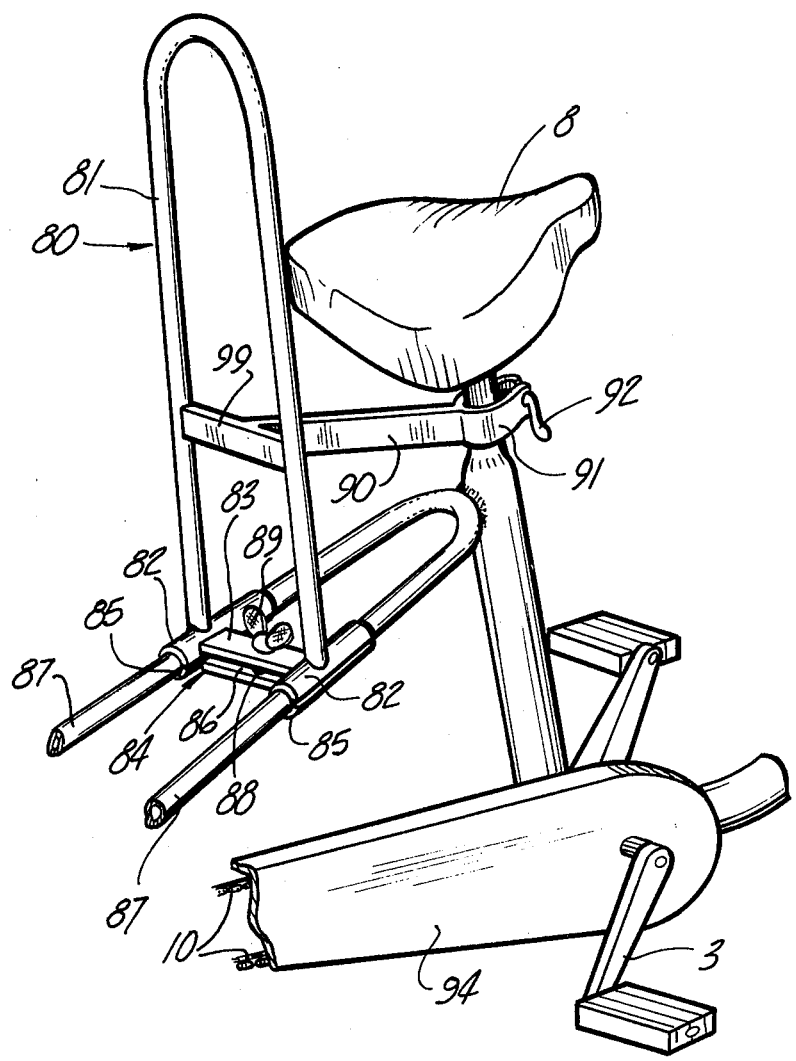
FIG. 17 is a partial view in perspective of an accessory frame member carrying a back support.

In accordance with another variation of the invention, there is provided a back rest, generally designated as 80 (FIG. 17), which comprises a U-shaped tubular back support 81 having a horizontal center brace 99 from the middle of which extends a transverse brace 90 having a clamp 91 which can be tightened onto the tricycle frame by a hand-operated screw 92. The arms of back support 81 are provided with semi-cylindrical splints 82 braced together by a horizontal brace 82. A lower support 84 comprises an opposite pair of semicylindrical splints 85 braced by a horizontal brace 86 having a length equal to brace 83. A bolt 88 and wing nut 89 hold braces 83, 86 together. A U-shaped auxiliary frame member 87 welded to main frame 4 supports splints 82, 85. A cover 94 protects chain 10.

What is claimed is:

1. An amphibious tricycle, comprising:

a frame having an elongate front-to-rear main frame member, a pedal drive, a handle bar, a saddle and a front fork, operatively mounted on said main frame member;

a hinge member disposed intermediate the ends of said main frame member to permit folding of said main frame member about a vertical axis;

a buoyant front wheel rotatably mounted on said fork for angular steering movement;

a U-shaped yoke member having two spaced apart posts outwardly extending from said yoke member, a pair of guide tubes on either side of said main frame member;

said posts being slidably mounted in said guide tubes and being securable to said guide tubes;

a pair of bearing sleeves coaxially aligned along an axis transverse to the plane of said main frame member;

a rear axle assembly rotatably supported by said bearing sleeves;

said rear axle assembly including: a cylindrical member having a length approximately equal to the distance between the inner ends of said bearing sleeves, a sprocket wheel mounted on said cylindrical member, a center axle having a length substantially equal to the distance between the outer ends of said bearing sleeves, said center axle having a longitudinal bore extending from each end thereof, each bore having a threaded socket at the end thereof;

a pair of stub axles, each stub axle having a reduced-diameter portion, the free end thereof being threaded, the reduced diameter portions being slidably mounted in said bores of said center axle with the threaded ends of said reduced-diameter portions being threadably secured to said sockets;

a pair of hollow stub shafts, a paddle wheel radially extending from the inner end of each shaft;

a pair of buoyant rear wheels mounted on the outer ends of said stub shaft;

a rudder mounted on the rear end of said main frame for pivotal movement about a vertical axis;

a pair of flexible steering cables extending in cross-relation between said front fork and said rudder to allow said rudder to rotate in a direction opposite from the direction of rotation of said front wheel; and a chain mounted on said sprocket wheel.

2. The tricycle of claim 1 wherein each wheel has an inner tube, an outer concentric tube, and a tire, said two concentric tubes being independent of each other and having separate valves.

3. The tricycle of claim 1 wherein each rear wheel has a rounder outer part, an inner part having a rectangular cross-section, and a plurality of paddles mounted on said inner part.

4. An amphibious tricycle, comprising:

a frame having an elongate front-to-rear main frame member, a pedal drive, a handle bar, a saddle and a front fork, operatively mounted on said main frame member;

a buoyant front wheel rotatably mounted on said fork for angular steering movement;

a U-shaped yoke member detachably secured to said main frame member;

a pair of bearing sleeves coaxially aligned along an axis transverse to the plane of said main frame member;

a rear axle assembly rotatably supported by said bearing sleeves, said rear axle assembly including: a hollow cylinder having a length approximately equal to the distance between the inner ends of said bearing sleeves, a sprocket wheel mounted on said cylinder, a center axle extending through said bearing sleeves and said cylinder, said center axle having a longitudinal bore extending from each end thereof, each bore having a threaded socket at the end thereof;

a pair of stub axles, each stub axle having a reduced-diameter portion having a threaded free end and being slidably received in a bore of said center axle with the threaded free end being threadably secured to a center axle's socket;

a pair of hollow stub shafts mounted on said stub axles, a paddle wheel radially extending from one end of each stub shaft;

a pair of buoyant rear wheels mounted on the other ends of said stub shafts;

a rudder coupled to the rear end of said main frame for pivotal movement about a vertical axis;

a pair of flexible steering cables extending in cross-relation between said front fork and said rudder to allow said rudder to rotate in a direction opposite from the direction of rotation of said front wheel thereby steering said tricycle; and a chain mounted on said sprocket wheel for driving said tricycle.

* * * * *

UNITED STATES PATENT OFFICE
CERTIFICATE OF CORRECTION

Patent No. 4,077,351        Dated March 7, 1978

Inventor(s) Manuel Garcia Girona

It is certified that error appears in the above-identified patent and that said Letters Patent are hereby corrected as shown below:

Column 2, line 16, following "8" insert a comma.

Column 2, line 61, following "has a" first occurence, insert ----transverse----.

Column 2, line 62, delete "transverse" second occurence.

Column 2, line 67, delete "an".

Column 2, line 68, delete "the" second occurence.

Column 3, line 41, following "71" delete the comma.

Column 4, line 4, delete "eaily" and insert ----easily----.

Column 4, line 20, delete "82" second occurence and insert ---83---.

Signed and Sealed this

Sixth Day of February 1979

[SEAL]

Attest:

RUTH C. MASON  
Attesting Officer

DONALD W. BANNER  
Commissioner of Patents and Trademarks